(12) United States Patent
Woock

(10) Patent No.: US 8,701,085 B2
(45) Date of Patent: Apr. 15, 2014

(54) GRAPHICAL EVENT AND BINDING EDITOR FOR SOFTWARE DEVELOPMENT

(75) Inventor: Hermann Ludwig Woock, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1137 days.

(21) Appl. No.: 12/329,977

(22) Filed: Dec. 8, 2008

(65) Prior Publication Data

US 2013/0179860 A1 Jul. 11, 2013

(51) Int. Cl.
*G06F 9/44* (2006.01)

(52) U.S. Cl.
USPC .......................................... 717/113; 717/129

(58) Field of Classification Search
USPC .................................. 717/113, 129
See application file for complete search history.

(56) References Cited

U.S. PATENT DOCUMENTS

| | | | |
|---|---|---|---|
| 7,003,730 B2 * | 2/2006 | Dettinger et al. | 715/764 |
| 7,793,258 B2 * | 9/2010 | Sundararajan et al. | 717/109 |
| 7,882,445 B2 * | 2/2011 | Neumann | 715/762 |
| 2003/0071845 A1 * | 4/2003 | King et al. | 345/764 |
| 2003/0196187 A1 * | 10/2003 | Kodosky et al. | 717/109 |
| 2005/0010899 A1 * | 1/2005 | Kung et al. | 717/108 |
| 2005/0071749 A1 * | 3/2005 | Goerke et al. | 715/501.1 |
| 2005/0262471 A1 * | 11/2005 | Wagner et al. | 717/101 |
| 2007/0256054 A1 * | 11/2007 | Byrne et al. | 717/113 |
| 2008/0126376 A1 * | 5/2008 | Leff et al. | 707/101 |

OTHER PUBLICATIONS

"MyEclipse Java Server Faces (JSF)"—Tools for developers using JSF/Advanced, available at http://www.myeclipseide.com/module-htmlpages-display-pid-14.html (last accessed Dec. 8, 2008), 14 pages.
"StrutsIDE—Project Amateras"—Eclipse plug-in for web application development that uses struts, available at http://amateras.sourceforge.jp/cgi-bin/fswiki_en/wiki.cgi?page=StrutsIDE (last accessed Dec. 8, 2008), 8 pages.
"Flex Article—Developing Flex RIAs with Cairngorm microarchitecture—Parts 1-6", available at http://www.adobe.com/devnet/flex/articles/cairngorm_pt2_print.html (last accessed Oct. 15, 2008), 54 pages.

\* cited by examiner

*Primary Examiner* — Li B Zhen
*Assistant Examiner* — Hang Pan
(74) *Attorney, Agent, or Firm* — Kilpatrick Townsend & Stockton LLP

(57) ABSTRACT

Application development and debugging can be aided through use of a graphical user interface that allows for mapping the relationship between user interface components and/or between business logic components. Particularly, an application development tool can support at least two views for developing an event-based application. In a static view, all possible bindings between components can be illustrated and, in some embodiments, edited. For example, an event generator component may be represented as a first screen component with links to one or other screen components with each link representing a different event that triggers one or more actions handled by the other components. The views may also illustrate data bindings between components. The application development tool can include a dynamic view where event relationships and/or data bindings between object instances can be viewed as code is executed.

19 Claims, 9 Drawing Sheets

GRAPHICAL EVENT AND BINDING EDITOR FOR SOFTWARE DEVELOPMENT

TECHNICAL FIELD

The disclosure below generally relates to application development tools.

BACKGROUND

Software development kits (SDKs) allow software engineers to quickly develop applications for software packages, frameworks, or platforms. Generally speaking, an application will include a user interface component that receives user input and provides output. For example, the ADOBE® FLEX™ SDK may be used to construct applications to be executed using the ADOBE® FLASH® platform (each available from Adobe Systems Inc. of San Jose Calif.).

Regardless of the particular SDK that is used, certain complications can arise when developing software applications. For example, some software development platforms may introduce concepts that are unfamiliar to designers. For instance, designers may be unfamiliar with event-based program structures. In some such structures, user input events can be provided to functions termed "business logic" that determine what outputs (if any) are to be provided to the user interface and/or other components. For example, a SDK may specify a set of user interface components such as buttons, list boxes, text controls, charts, graphs, media components, menu controls, data components/bindings, and layout containers (e.g. grids, forms, boxes, etc.). Certain SDKS may provide a framework to relay data to and from web services, while others may allow construction of an application for use in a local environment.

The user interface may have many input/output components and may be intended for use with business logic methods that can provide multiple possible outcomes. The combination of a powerful interface, complex business logic, and nontraditional programming concepts may result in significant problems in developing applications in event-based software development environments, particularly with regard to debugging.

SUMMARY

Certain embodiments of the present subject matter can reduce or eliminate complication in the application development and debugging process through use of a graphical user interface that allows for mapping the relationship between user interface components and/or between business logic components.

Particularly, an application development tool can support at least two views for developing an event-based application. In a static view, some or all possible bindings between components can be illustrated and, in some embodiments, edited. For example, an event generator component may be represented as a first screen component with links to one or other screen components that are event listeners. Each link can represent a different event that triggers one or more actions handled or performed by the other components in response to the event.

For instance, a representation of an input button may be linked to two different handlers, with one link representing a connection to a handler that provides a desired response when a user hovers over the button and another link representing a connection to a different handler that provides a desired response when a user clicks on the button.

In some embodiments, data bindings may be represented in the same view or in another view. Data bindings can represent that an interface component is updated as a corresponding data value changes. For example, a text box may be updated based on a variable representing a current index value in a stock market. The data binding relationship between the text box component and the data generating component can be depicted visually.

An application development tool can also support a dynamic view at runtime (e.g., for debugging). In the dynamic view, as the program is stepped through, a view of the relationship between objects can be updated with an indication of where the current thread lies with regard to the different event generators and response handling components.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Figure 1:
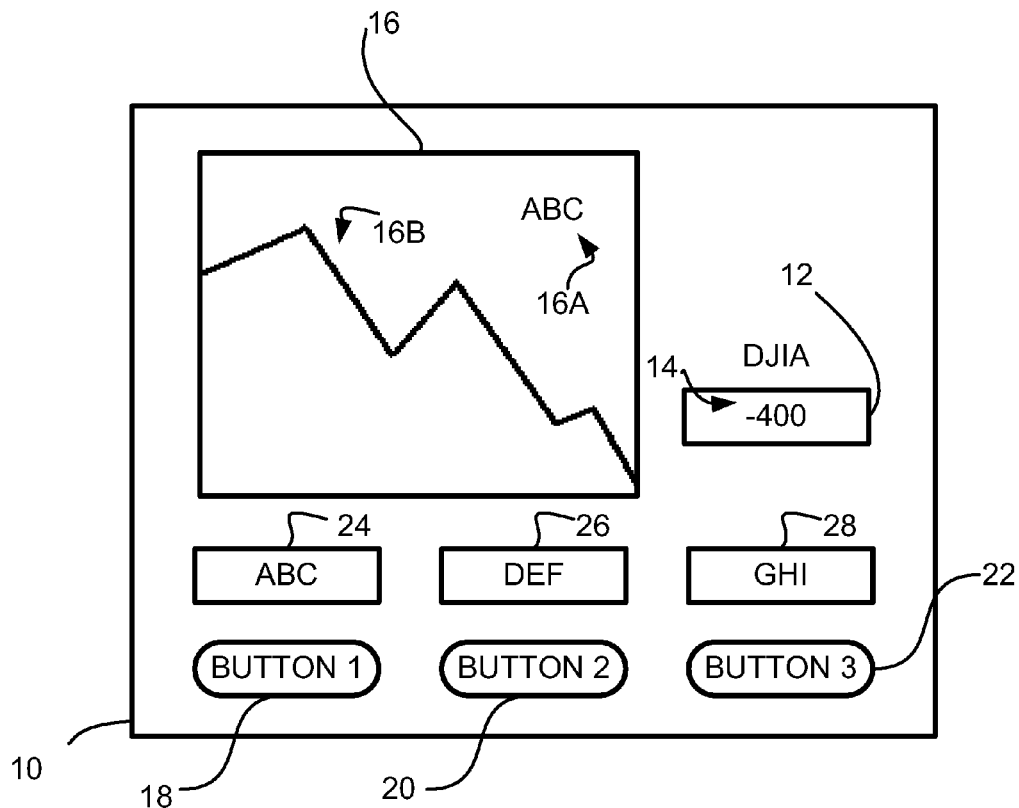
FIG. 1 is a diagram illustrating an exemplary user interface for an application.

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of claimed subject matter. However, it will be understood by those skilled in the art that embodiments of the present subject matter may be practiced without these specific details. In other instances, methods, apparatuses or systems that would be known by one of ordinary skill have not been described in detail so as not to obscure the present subject matter.

A computer-implemented method can comprise, for example, accessing source code for an application and parsing the source code to identify a plurality of components and at least one relationship between two or more components. For instance, the relationship may comprise an event relationship or a data binding relationship. The event relationship may identify an event generating component and one or more event receiving components that provide output or take other action upon triggering by an event. A data binding relationship may identify a data binding between a source component that originates the data and one or more event receiving components that receive the data. The method can comprise rendering a static view diagram illustrating the identified components and at least one relationship between the components.

For example, each component can define an object class or a business logic method. Relationships may be indicated as arrows or lines indicating an event generated by one component that triggers one or more actions by another component. Another example of a relationship can comprise a data binding indicated by an arrow connecting a data value output or used by one component (the receiving component) to a data value provided by another (the originating component).

In some embodiments, the static view acts as a graphical user interface for editing program code. The computer-implemented method can further comprise receiving input on the diagram defining a relationship between at least two components and updating the source code for the application to reflect the defined relationship. For example, the received input can comprise a command connecting one representation of a component to another in the rendered diagram, such as adding an arrow or line between components to represent an event or data binding. The received input may also comprise changing an existing event or data binding relationship. Input may also include adding a new component entirely, such as an additional object class or business logic method.

In some embodiments, the diagram can be used to specify and display breakpoints for use in a dynamic view. The computer-implemented method can comprise receiving data identifying a diagram breakpoint by reference to a particular event. The breakpoint can be set to occur just after the event in some embodiments.

The breakpoint can be used to trigger a break in debugging the source code in conjunction with an interpreter or other component that steps through the source code. The method can, for example, further comprise executing the source code until the identified breakpoint is reached and rendering a diagram illustrating each instance of a component generated by executing the code up to the breakpoint, and each event that has occurred up to the breakpoint. In some embodiments, fewer than all of the components and/or events may be displayed. Several breakpoints may be defined and a user can step through a program and graphically observe events and data bindings as they occur.

FIG. 1 depicts a user interface window 10 for an example of an application that can be developed using a software development tool configured in accordance with one or more aspects of the present subject matter. In this example, user interface window 10 can be used to interact with one or more providers of stock market data.

For example, user interface window 10 may comprise an interface generated by a SWF file for rendering by an event-driven application such as ADOBE® FLASH® (available from Adobe Systems, Inc. of San Jose, Calif.). In this example, window 10 includes a market status indicator 12 ("DJIA") that depicts a current market status value 14 ("−400" in FIG. 1). Additionally, window 10 includes a graph 16 comprising a label 16A and a time series 16B. For example, time series 16B may correspond to the value of a stock whose symbol is indicated at 16A.

Window 10 further includes three buttons 18, 20, and 22, and three text input boxes 24, 26, and 28. For example, a user may be able to enter stock ticker symbols into the respective boxes for display on graph 16. Particularly, a symbol may be entered in box 24 and its stock displayed when button 18 ("button 1") is clicked; a symbol may be entered in box 26 and its stock data displayed when button 20 ("button 2") is clicked; a symbol may be entered in box 28 and its stock displayed when button 22 ("button 3") is clicked. Right clicking a button may clear the contents of the graph.

The functionality described above may be implemented in any number of ways. Ultimately, the application will include user interface (UI) components that are used to receive user input and provide output, additional components that generate data values apart from user input, and functions, processes, and components ("business logic") that provide output based on the state of one or more variables (from user input or otherwise).

Figure 2:
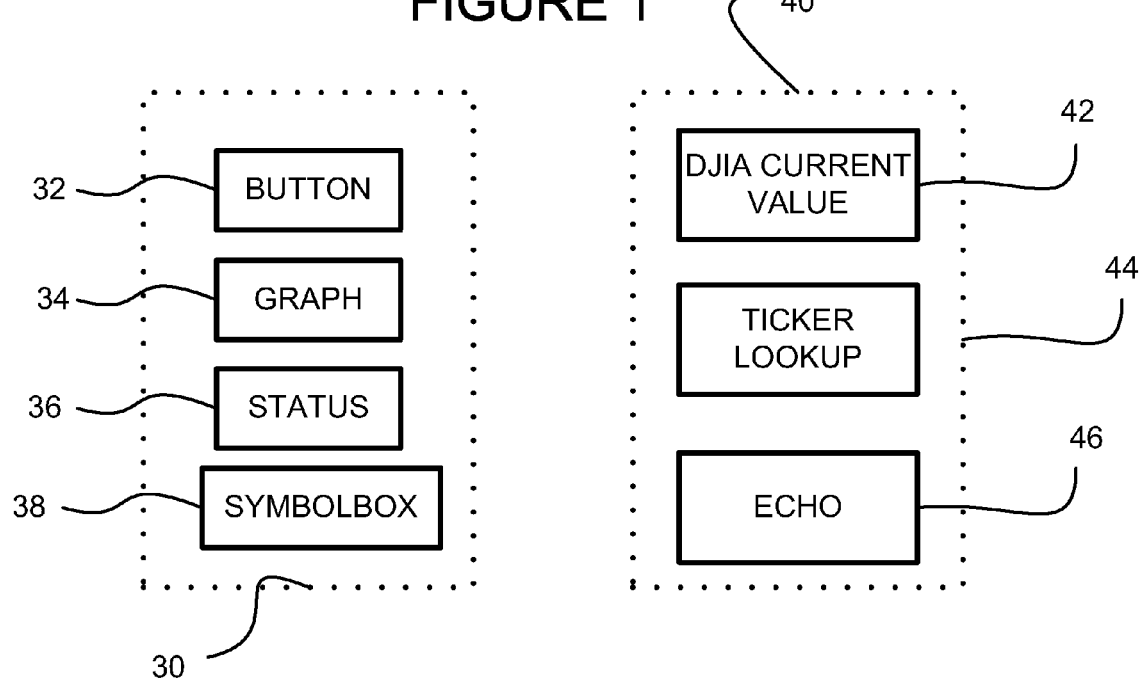
FIG. 2 is a block diagram illustrating exemplary software components for the application of FIG. 1.

FIG. 2 schematically represents example components for rendering an application such as the one depicted in FIG. 1. In this example, UI components 30 include a button class 32, a graph class 34, a status class 36, and a symbol box class 38. Each class corresponds to a set of code. Classes may be defined by the SDK or custom classes may be defined by a user.

For example, a button class 32 may correspond to a button object such as buttons 18, 20, 22, and 24 of FIG. 1. Each instance of button class 32 may produce one or more output events, such as "OnClick( )" or "RightClick( )" corresponding to when a user left clicks on or right clicks on a button, respectively.

Each instance of graph class 34 may be operative to generate a graph in response to input of a time series and/or in response to a label variable. Graph class 34 may also be responsive to commands to clear the time series or clear the label variable. Although in this example graph class 34 does not generate events, in other embodiments graph class 34 may support generating events (such as OnHover( ) when a user hovers over the graph).

Each instance of status class 36 generates a text display box. Status class 36 may generate a request event "Request( )" and support an update event "Update( )" whereby the contents of the text display box can be updated. For example, status box 12 of FIG. 1 includes a value 14. A status box may periodically request an update for its value. As another example, status class 36 may generate an "OnHover( )" event when a user hovers over it or an "OnClick( )" event when a user clicks on it.

Each instance of symbol box class 38 represents a text input box. Symbol box class 38 may provide the contents of the textbox when queried by a process or method. As another example, symbol box class 38 may provide an "OnText( )" event specifying when text is entered and the contents of the entered text.

Business logic components 40 include a DJIA current value method 42, a "ticker lookup" method 44, and an "echo" method 46. These components correspond to functions that carry out the desired operations of the example application of FIG. 1. Generally, a method may act in response to one or more triggering events and provide one or more outputs in response. Some methods may act as event generators without the need for a trigger.

For example, DJIA current value method 42 may correspond to a function that queries a web service for the most current value of the Dow Jones Industrial Average. Once that data is obtained, the function can provide the current average as a variable.

Ticker lookup method 44 may represent a function that receives a stock ticker symbol and queries a database and/or web service for price data for the stock represented by the ticker symbol. In this example, ticker lookup method 44 requests or assembles a time series of price values.

Echo method 46 is a function that simply queries an object holding data and then echoes the returned data to one or more other components. In this example, echo method 46 is triggered as a response to a request from another component.

Figure 3A:
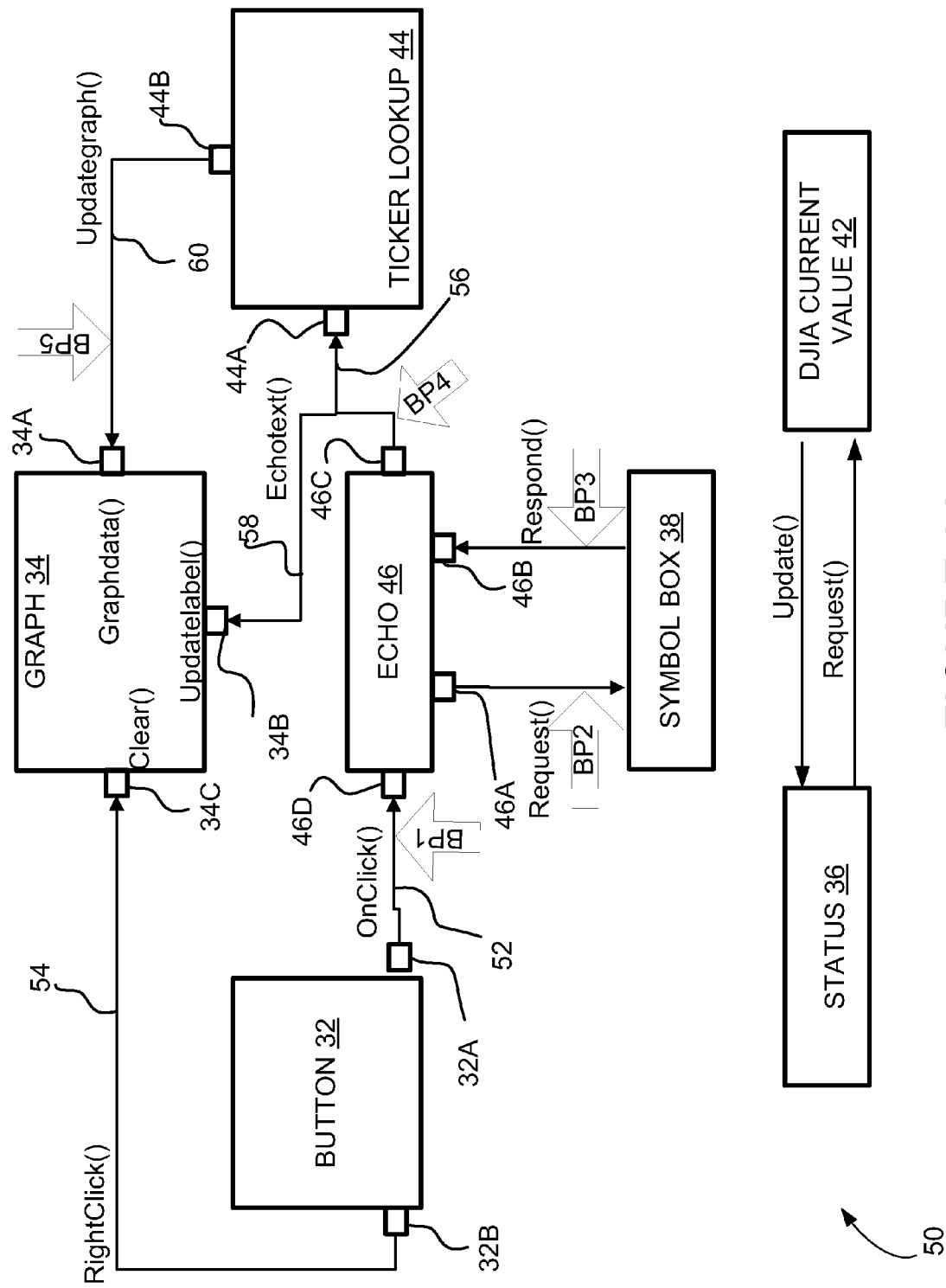
FIG. 3A is an example of a rendering of a static view of event relationships in accordance with some aspects of the present subject matter.

Turning now to FIG. 3A, an exemplary static view 50 of the example stock status application of FIG. 1 is shown. This is an example of an "Event view" that may be rendered by a software development tool configured in accordance with the present subject matter. Static view 50 can be used to represent how different component classes are related in terms of events.

In this example, the button class is represented at 32. Note that in the "event view" of this example, each class is represented as a single component. In practice, each class may give rise to several object instances, but these are not shown in static view 50. As shown by arrows 52 and 54, button class 32 provides output events to graph class 34 and echo method 46. Node 34C of graph class can represent an input command to a graph object to clear the contents and label of the graph. As shown in this example, the "Clear( )" command is noted on the representation of graph class 34 at node 34C.

Arrow 54 includes the annotation "RightClick( )" to signify that a right-click event from button class 32 triggers a clear command to graph 34. Similarly, arrow 52 includes the annotation "OnClick( )" to signify that a left click event triggers a command to echo method 46.

As was noted above, echo method 46 receives a triggering command and then issues a request to another component and echoes the returned value. Arrow 52 represents the triggering event. For example, node 46D may correspond to the trigger input for echo method 46. Nodes 46A and 46B may represent functions that issue the request event to another component and receive the returned data. Finally, node 46C can represent the output of echo method 46, represented as an event "echotext( )" at arrows 56 and 58.

In this example, echo method 46 issues its request to and receives data from symbol box class 38. As was noted above, symbol box 38 can represent a text box class that receives user input. This diagrammatically represents how the echo method, in response to a click event at a button, issues a request for the current stock data for the symbol entered into a symbol box.

Arrows 56 and 58 represent "echotext( )" events whereby echo method 46 provides data to graph class 34 and ticker lookup method 44. Arrow 58 connects output node 46C of echo method 46 to input node 34B of graph class 34. As indicated by the annotation, node 34B corresponds to an "Updatelabel( )" command that causes graph class 34 to update its label to indicate the provided label data. Thus, text echoed by echo method 46 will be placed onto graph 34.

Arrow 56 connects output node 46C to provide the echotext( ) event to ticker lookup method 44. Ticker lookup method 44 receives the ticker symbol and provides time series data at node 44B to node 34A of graph class 34. Thus, when echo method 46 provides a ticker symbol, ticker lookup method 44 retrieves the data for the stock of interest and then provides the data in a suitable form to the graph class 34.

Status class 36 and DJIA current value method 42 are also shown in static view 50. In this example, status class 36 issues a request event "Request( )" and, in response, DJIA current value method 42 provides an "Update( )" event containing the most recent stock index value.

The static view can help an application designer adjust how certain events change output conditions. For instance, without the static view, a designer observing the user interface 10 shown in FIG. 1 or the underlying source code may not be able to easily discern that, for example, the current status box 12 automatically updates. However, this may be clear from the "Request( )" and "Update( )" relationship indicated between status box 36 and DJIA current value method 42.

As another example, it may not be immediately clear from the source code that the graph is only updated for new symbol box values when a button is clicked. However, this can be seen in the static view via the connection between the OnClick( ) event of button class 32, echo method 46, and graph 34.

As a further example, a defect in the code may be difficult to identify in reviewing the source code. For instance, if a previous designer inadvertently specified that hovering over a button clears the contents of the graph, this error may be difficult to locate if the source code is lengthy. On the other hand, static view 50 clearly shows at arrow 54 which event triggers clearing of graph class 34.

Static view 50 may further support editing in some embodiments. For instance, continuing with the example of an error in the code, a user may be able to right-click on arrow 54 and select a desired output event behavior supported by button class 32. If the code erroneously specifies "OnHover( )", the user can change the event to "RightClick( )" or "Double-Click( )." The user interface may display the corresponding source code for the application and/or the button class in isolation to aid in this process. If needed, the user may be presented with the option to define a new event for the button class.

As another example, the user may wish to change the functionality of status box 36. For instance, to avoid constant requests to DJIA current value method 42, the user may click on the "Request( )" arrow and change the event to "OnHover( )" so that the value of status box 36 is only updated in response to a user hovering over status box 36.

The user could significantly change the functionality of the application. For instance, assume that symbol box class 38 supports an output event "OnText( )" that specifies newly-entered text. A user could delete echo method 46 entirely and then connect the "OnText( )" event from symbol box class 38 to ticker lookup method 44 and graph method 34 to provide the entered text for lookup and for labeling on the graph. Button 32 could remain connected to graph class 34, but instead of a "RightClick" event, the "Onclick( )" event could trigger clearing of graph 34.

As a result, returning briefly to FIG. 1, entry of a symbol into one of boxes 24, 26, or 28 would automatically update graph 16. Clicking any instance of button 18, 20, or 22 would clear graph 16.

Figure 3B:
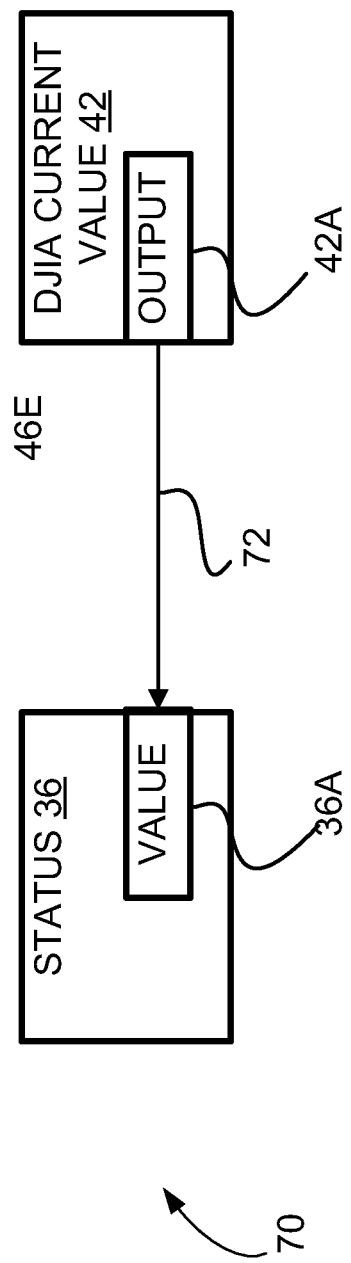
FIG. 3B is an example of a rendering of a static view of data bindings in accordance with some aspects of the present subject matter.

FIG. 3B represents a data binding view 70 which may be useful in deciphering the static view of an application under development. Although data bindings and event bindings may be represented simultaneously in a static view, in some embodiments, the data binding and event bindings can be viewed separately. This example features an alternative implementation of the DJIA feature. Namely, the DJIA current value method 42 includes a data output value 42A that is bound to the value of status class 36 as shown by 36A. The binding is represented by arrow 72. Due to this data binding relationship, any change in data output value 42A will automatically be reflected by output from status class 36, and thus no query or other event would be needed on the part of status box 36 to obtain an updated value.

The data binding view may support editing of the code. For example, adding arrows between components in the data binding view can correspond to passing variables between methods, between objects, or between methods and objects so that when a data value provided by one model changes, the value in the target model automatically changes. The data binding view may be automatically updated when a user makes changes in the event view if those changes affect data binding.

For example, to create a data binding based on activity in the static view in a development tool that supports Actionscript™, a "[Bindable]" tag can be added to a variable in the model that is the source for the binding. Code representing the target control can be updated by adding curly brackets, an include statement, and the variable. Of course, the particular syntax will vary according to how data bindings are represented in the coding language and this is only presented as an example. As another example, the code may support explicit definitions of bindings (e.g., the "BindingUtils" class in Actionscript™ can provide a bindproperty( ) function).

In the event view, adding an arrow between two nodes represents an instance of a class providing output. Thus, when an arrow is added from an originating class to a receiving class, code can be generated that ties the occurrence of the event as defined by the originating class to the action to be taken or other desired response by the receiving class. For example, in FIG. 3A, button class 32 may include code that generates an "OnClick( )" event when the button is clicked. Echo class 46 may include code that, when run, issues a request to a symbol box and waits for a response. By tying an "OnClick( )" node to a node triggering the "echo" class function, a new function can be added to the code for the application. The code can include the code defined for the echo class function, but structured for the echo class code to be triggered upon the "OnClick( )" event. For example, code for the event-generating class (in this example, button class 32) can be extended to include a "metadata/event" tag and to call dispatch when the event occurs. Code corresponding to the event recipient (in this case echo class 46) can be adjusted to include a listener for the new event.

As noted below, static views can be generated from code defining the application. The code can be parsed to identify classes corresponding to functions and classes corresponding to event generators and handlers based on code syntax. Event mappings can be determined by analyzing the relationship between different functions in the code. Data bindings can be determined by examining how variables are passed between functions.

Parsing the code can depend on the code syntax. The syntax can relate to not only the coding language used, but a particular coding paradigm (sometimes referred to as a framework or micro-architecture) that is used. As is known in software engineering, different coding patterns can be used to logically arrange different aspects of a program. Accordingly, the particular patterns appearing in the code may depend on a coding framework that is used. For example, the Cairngorm framework for FLEX applications supports the "MVC" (model, view, control) paradigm in which an event transmitter starts with the dispatch call of the event and ends at the command class. In those cases, a "metadata" tag may not be needed in the code, but the FrontController class (which, in the Cairngorm framework, acts as a single point of entry for all Cairngorm events) can be extended to control events as needed. Other frameworks for FLEX such as PureMVC, Mate, Swizz can be supported differently. An application development tool can be configured to use templates for selecting how event relationships and data bindings are expressed and thus may be more extensible.

In some embodiments, if a diagram is changed, then the code is updated when the diagram is saved. Furthermore, if a class file is changed and then saved, the class file can be checked to determine if the changes have an effect on the diagrams. Spatial information for generating the diagrams can be stored in any suitable manner. For instance, an xml notation could be used.

Figure 4:
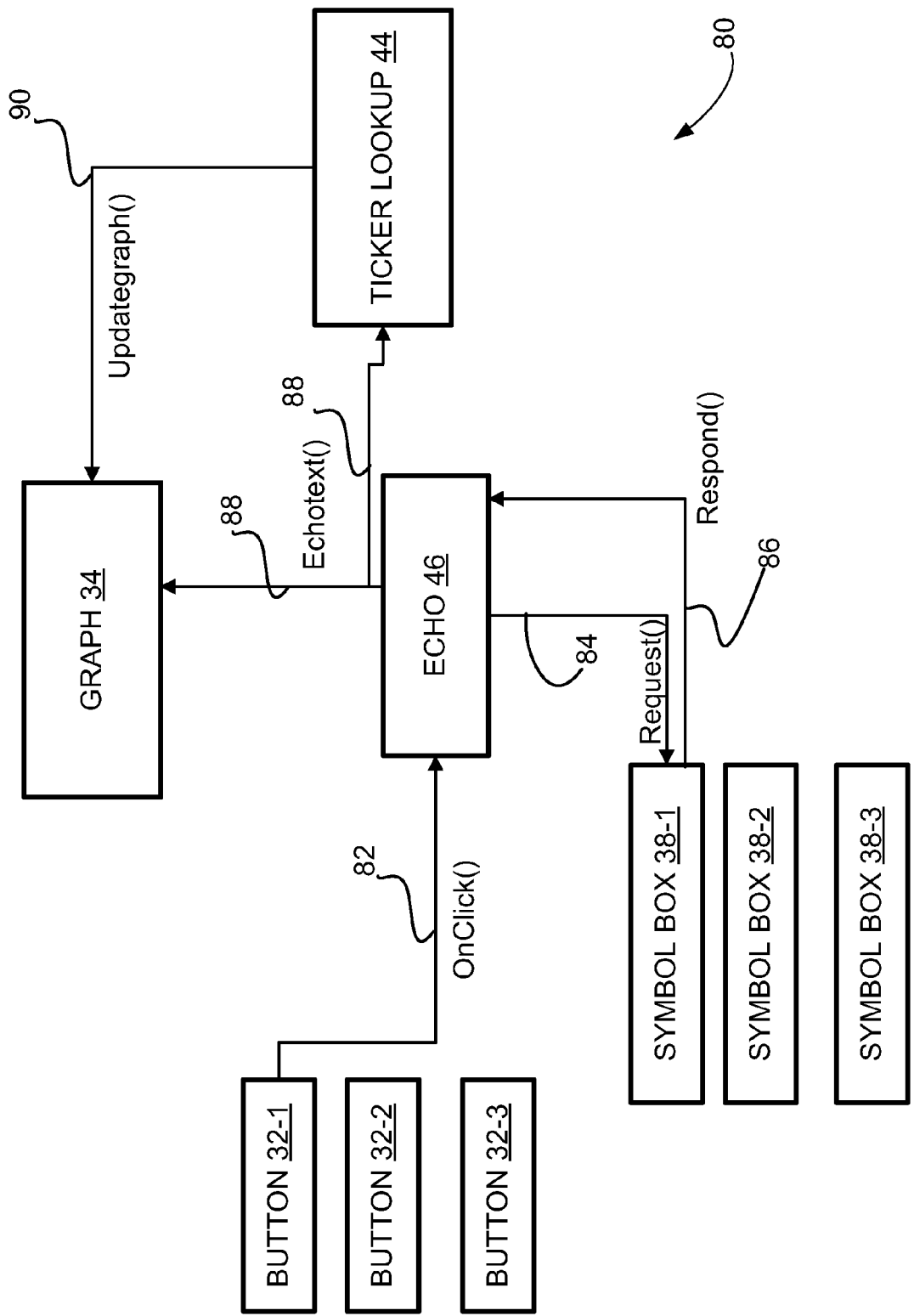
FIG. 4 is an example of a rendering of a dynamic view of object relationships in accordance with some aspects of the present subject matter.

Some embodiments of the present subject matter support a dynamic view of the code. This may be especially useful for debugging purposes. FIG. 4 illustrates an exemplary debugging view 80 in accordance with some aspects of the present subject matter. This example will be discussed alongside static view 50 of FIG. 3A. Static view 50 of FIG. 3A illustrates five breakpoints BP1-BP5. For example, a user may be able to click or otherwise set breakpoints and then trigger a dynamic view.

The dynamic view visually represents the components of the application at runtime. The application may be previewed in a separate window to allow for the user to provide input and monitor output during the dynamic view. As another example, variables or actions may be pre-set.

In contrast to the static view where each item in the diagram represents a class (or a method), in the dynamic view each object (i.e. instance of the class) is represented as a separate item. This is because different instances of a class exist during runtime. The program counter can pass the static code independent of the actual instance, but with a different context (for example, different member variables and different threads). In the code (and static diagram) relationships are implemented as pairs of event generators and event listeners. In the dynamic view, the perspective for each instance is driven by that instance's context, and changes are illustrated as the program counter jumps to the appropriate action after an event (e.g. to an instance of an event listener).

Thus, as shown in FIG. 4, three instances 32-1, 32-2, and 32-3 of button class 32 are illustrated. Similarly, three instances 38-1, 38-2, and 38-3 of symbol box class 38 are shown. A single instance of graph 34 and single instances of ticker lookup function 44 and echo function 46 are illustrated since only one instance is triggered by the code of this example.

The first breakpoint BP1 in FIG. 3A is placed at the end of an Onclick( ) event. Thus, dynamic view 80 will render the components of the application and execute the code until an OnClick( ) event is issued from an instance of button class 32. In this example, arrow 82 will appear when an OnClick( ) event issues from instance 32-1. For instance, this may be triggered by a user clicking in the preview pane on a button.

Once a breakpoint is reached, execution of the application is suspended. In some embodiments, an additional window or view also tracks which line of the code is being executed. This may allow the user to fine-tune behavior of the application at the breakpoint.

The dynamic view can support resuming execution after the breakpoint. In this example, the second breakpoint BP2 occurs when echo function 46 issues its request to symbol box 38. This is shown by arrow 84 in FIG. 4. For example, if the instances of button class 32 and symbol box class 38 are generated by an iterative loop, this breakpoint may allow the user to ensure that the correct symbol box is queried when button 32-1 is clicked. A third breakpoint BP3 is included to verify that symbol box 38-1 is correctly providing a Respond( ) event as shown by arrow 86.

A fourth breakpoint BP4 stops execution once echo function 46 provides an echotext( ) output event to graph 34 and ticker lookup 44. A fifth breakpoint BP5 stops execution once arrow 90 has indicated that the Updategraph( ) event has issued from ticker lookup function 44.

Breakpoint activity may be illustrated in different ways. For example, at the fourth breakpoint BP4, arrows 82, 84, 86, and 88 may all be visible. Arrow 88 may be annotated to indicate that it represents the most recent event. For example, arrow 88 may be a different color, may have a "glowing" effect, or may be highlighted.

Figure 5:
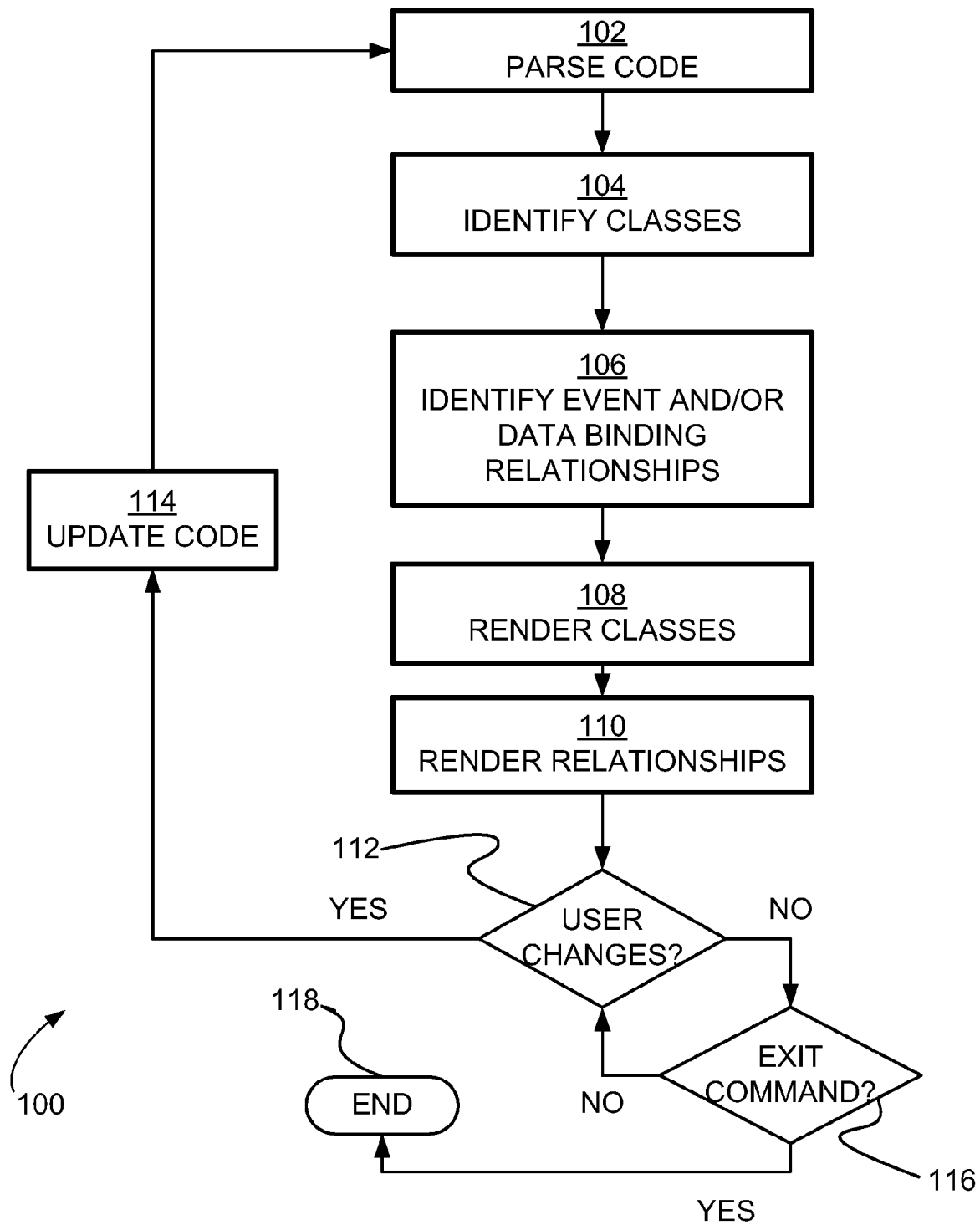
FIG. 5 is a flowchart showing an exemplary method for rendering a static view.

FIG. 5 is a flowchart illustrating an exemplary method 100 for generating a static view. At block 102, the code defining the application is parsed. At block 104, classes are identified based on the code syntax. Generally, each class is defined using a syntax specified by the code being used. For example, the class definition portions of the code can set forth the name of each class, the variables and type of data contained in instances of the class, and methods supported by the class. Block 104 can also include identifying functions (i.e. "business logic") used by the application. Functions can be recognized by calls to external resources, such as web services or other applications.

Block 106 represents identifying event relationships between classes and/or between classes and business logic components. For example, these relationships can be found by accessing a set of event methods supported by components as determined from parsing the code and then determining which of those methods are called, which components call the methods, and conditions or variables associated with calling the methods. For example, as was noted above, in some FLEX implementations, event classes may include code signifying a "metadata/event" tag and call dispatch. Event recipients may include code signifying an event listener.

At blocks 108 and 110, the classes and event relationships are rendered, along with representations of the business logic components. For example, block diagram components can be generated in a window with appropriate labels. Even relationships can be identified by arrows, such as the arrows of FIG. 3A where an arrow points from an event originator to an event receiver.

At block 112, the method checks for user input, such as additions of classes or functions or changes to relationships between classes and/or functions. If there are any such changes, the code is updated at 114 and the static view is rendered again. If there are no changes, the method checks for an exit command at 116, and if such a command is provided the method ends at 118.

The example of FIG. 5 related to rendering a static view of event relationships between classes and/or business logic. Similar principles can be used to determine data bindings. For example, as was noted above, the "[Bindable]" tag may be included in a model for the source of the binding and curly brackets and the variable may signify the target of the binding in certain FLEX implementations and/or bindings may be defined explicitly.

Figure 6:
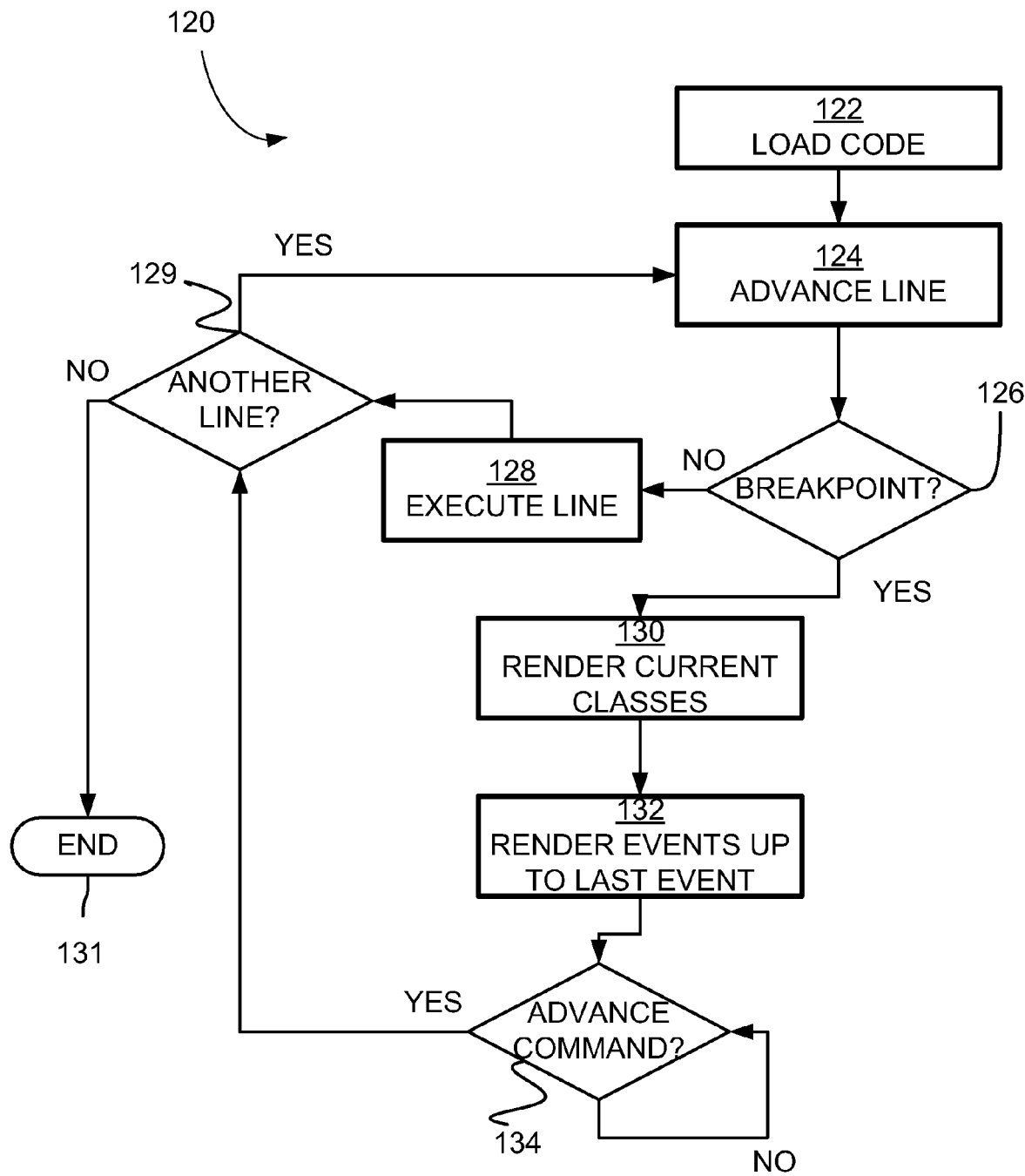
FIG. 6 is a flowchart showing an exemplary method for rendering a dynamic view.

FIG. 6 shows an exemplary method 120 for generating a dynamic view. It should be understood that the principles of text-based debuggers can be used to implement the dynamic view, but with the addition of a visual representation of the program components as set forth herein. At block 122, the program code is loaded into an interpreter. At block 124, the interpreter advances to a line of code and checks for a breakpoint at 126. If no breakpoint is found, the line is executed at 128, a check for another line is performed at 129, and assuming there is another line, the method returns to 124. This sequence continues until there are no more lines of code or until a breakpoint is identified at 126.

When a breakpoint is found, then at block 130 the working memory for the application is accessed and each instance of a class is rendered in a dynamic view such as shown in FIG. 3B. Additionally, as shown at block 132, events up to the most recent event are rendered. For example, during the execution of the code, the interpreter may maintain a working copy of memory at each line or otherwise at several points in time up to the breakpoint. The events can be identified by data indicating changes for instances of one class triggered by one or more other instances. The most recent event prior to the breakpoint may be annotated by a certain color, highlighting, etc. as noted previously above.

In some embodiments, not all of the components and/or relationships are illustrated. For example, the dynamic view may render only the components associated by the relationship that triggered the breakpoint. As another example, the components associated by the relationship that triggered the breakpoint may be illustrated along with components associated by a set number of the most recent events.

At block 134, the method awaits an advance command. For example, if several objects and events have occurred, the user may take some time to examine the progress of the application. In some embodiments, the code may be displayed alongside the dynamic view, and the user may make edits to the code from that view. Once an advance command is received, the method returns to block 129 and advances to the next breakpoint or to the end of the code.

Figure 7:
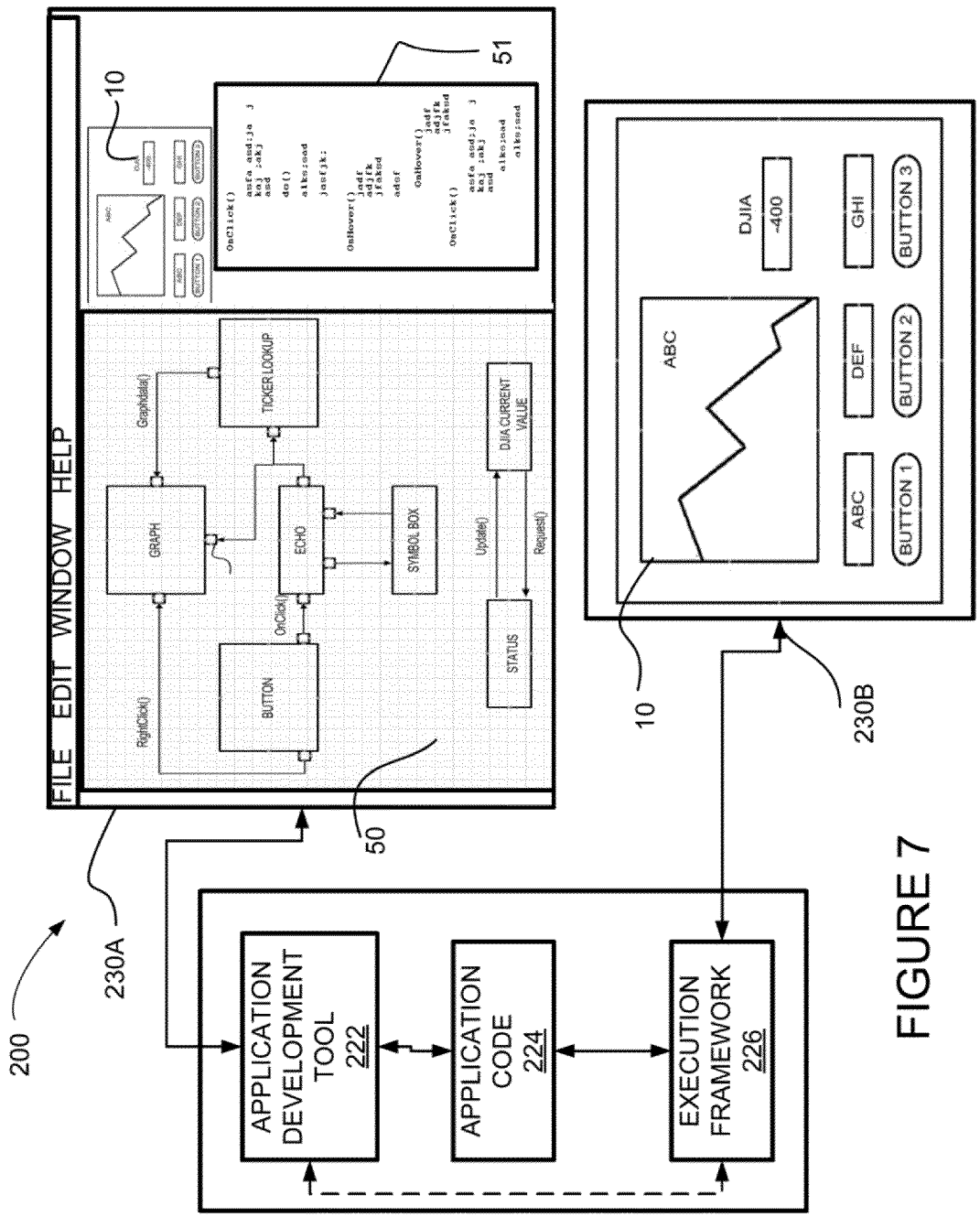
FIG. 7 is a block diagram showing an example of the context in which an application development tool in accordance with the present subject matter can be used.

FIG. 7 is a block diagram showing an example system 200 including an application development tool 222 configured in accordance with one or more aspects of the present subject matter. In this example, a computing device 220 executes one or more software components, processes or applications to provide an application development interface 230A. In this example, application development interface 230A is provided by an application development tool 222 as indicated by arrow 228A. Computing device 220 also includes a copy of application code 224 that is created, edited, or simply viewed using application development tool 222. Application development tool can include additional components such as compilers, debuggers, etc. that can be used to prepare source code and convert the source code into one or more applications.

In this example, computing device 220 also includes execution framework 226 that allows execution of application code 224 to render application interface 230B as shown by arrow 228B. Execution framework 226 may be accessed by application development tool 222 for use in rendering the dynamic view or otherwise providing the user with an execution-time view of the application under development. For example, application code 224 may be written for execution using the ADOBE® FLASH® framework for local or remote execution of SWF files. In other embodiments, an operating system may comprise the execution framework. In this example, execution view 230B includes a view of application interface 10 of FIG. 1.

In FIG. 7, application development interface 230A includes a view of the application interface 10, a partial view of static view 50, and a view 51 of the source code comprising application code 224. Application development interface 230A may further include a dynamic view such as view 80 of FIG. 4 or a static view showing data bindings such as view 70 of FIG. 3B. In some embodiments, clicking or selecting portions of the static (or dynamic) view may result in highlighting or other feedback for the source code view and vice-versa.

Application development interface 230A can support any suitable interactions with a user, including point-and-click commands, dragging and dropping, menu commands, and textual or other input whereby a user can adjust the relationship between components or enter data. Similarly, application interface 230B can support user interaction with the application as executed.

Figure 8:
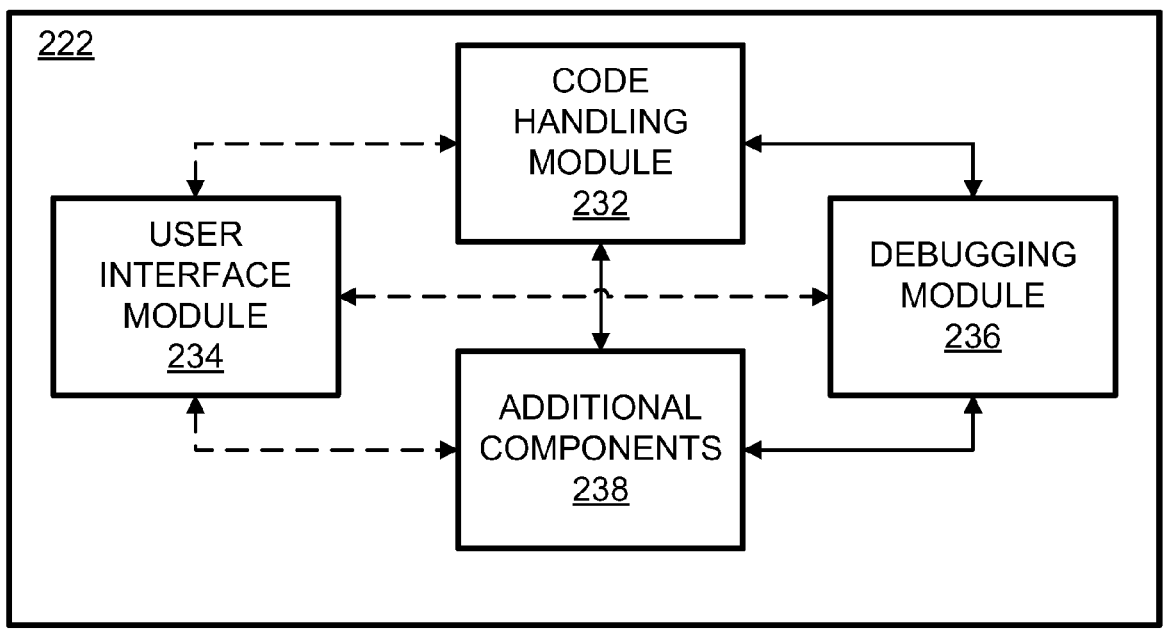
FIG. 8 is a block diagram showing an exemplary application development tool.

FIG. 8 is a block diagram showing an exemplary application development tool 222. In this example, application development tool comprises a plurality of software modules. In this example, application 222 includes a source code handling module configured to access and parse source code to identify a plurality of components and a relationship between two or more components, the relationship identifying an event generating component and one or more event receiving components.

Source code handling module 234 may additionally or alternatively identify a data binding between two components identified in the source code. Application 222 includes a user interface module 234 in communication with the remaining modules. For example, user interface module 234 may support user gestures such as clicks, drag-and-drop, slider adjustments, typing, and other manners of providing input. User interface module 234 may also be configured to render a diagram illustrating the identified components and a relationship between the components.

User interface module 234 can be further configured to receive input on the diagram defining a relationship between at least two components and, in response, source code handling module 232 can be configured to update the source code to reflect the defined relationship.

User interface module 234 can also support input of breakpoints as noted above. Debugging module 236 can coordinate a debugging process based on the breakpoints. For example, debugging module 236 can interface with a compiler or interpreter to execute the source code until the event identified by the breakpoint is reached and provide information to user interface module 234 in order to illustrate component instances generated by executing the code up to the breakpoint, along with events that have occurred up to the breakpoint.

Application development tool 222 can include additional components 238, such as other software modules providing functionality of conventional development tools, such as identifying potential errors in code, providing a 'design view' for editing the appearance of user interface elements, managing libraries, components, and workflow, and the like. Although illustrated as a plurality of software modules, it will be understood that application development tool can be implemented in any suitable manner whereby the desired functionality is achieved. In practice, functionality may be apportioned differently amongst modules or the module structure may not be used, for instance.

Figure 9:
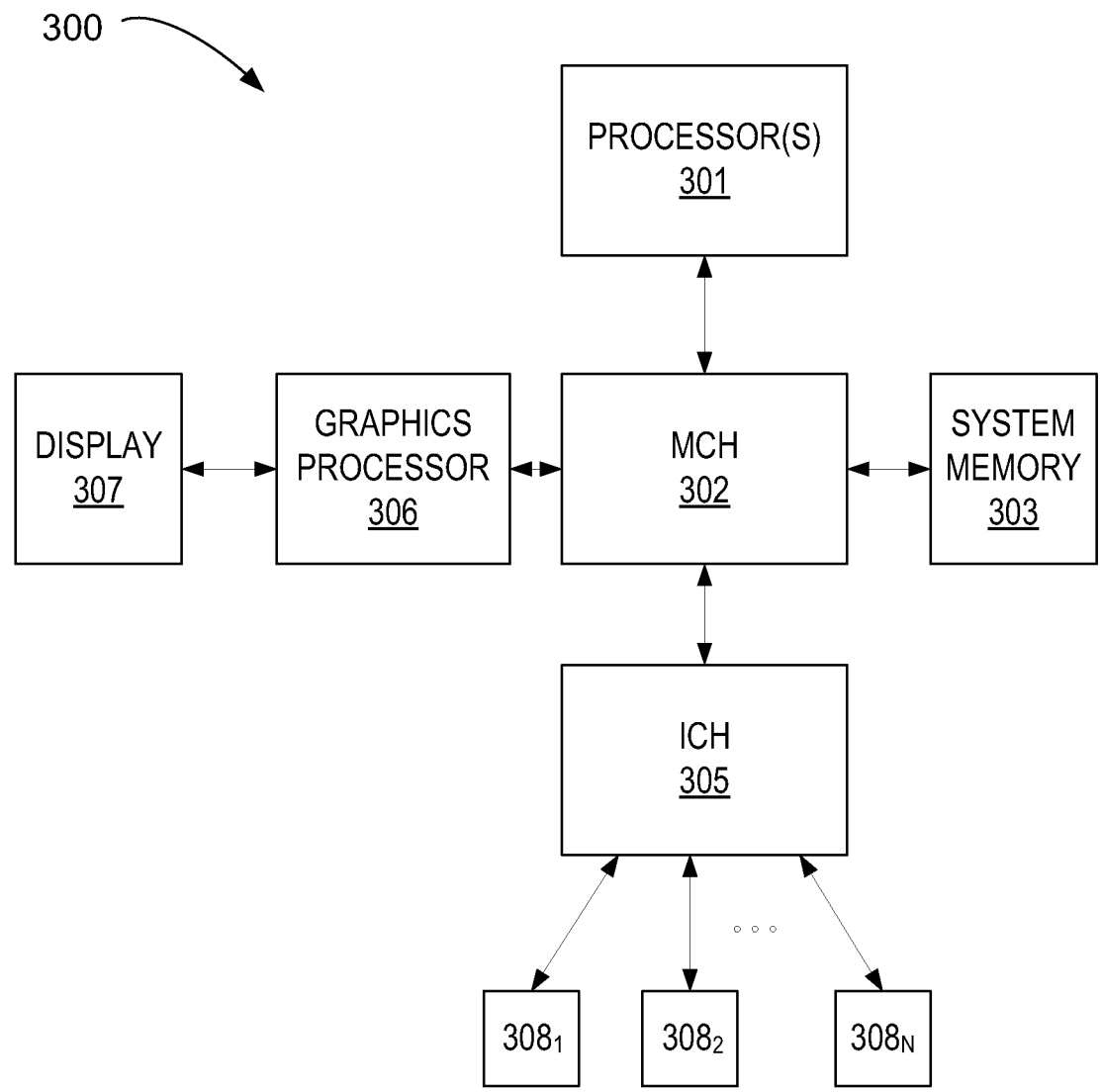
FIG. 9 is a block diagram depicting an example of a computing device suitable for implementing embodiments of the present subject matter.

FIG. 9 illustrates an example of computing device 300 suitable for implementing a software development tool and/or executing other software as described in the examples above. The exemplary computing system of FIG. 9 includes: 1) one or more processors 301; 2) a memory control hub (MCH) 302; 3) a system memory 303 (of which different types exist such as DDR RAM, EDO RAM, etc); 4) a cache 304; 5) an I/O control hub (ICH) 305; 6) a graphics processor 306; 7) a display/screen 307 (of which different types exist such as Cathode Ray Tube (CRT), Thin Film Transistor (TFT), Liquid Crystal Display (LCD), DPL, etc.); and/or 8) one or more I/O devices 308.

The one or more processors 301 execute instructions in order to perform whatever software routines the computing system implements. The instructions frequently involve some sort of operation performed upon data. Both data and instructions are stored in system memory 303 and cache 304. Cache 304 is typically designed to have shorter latency times than system memory 303. For example, cache 304 might be integrated onto the same silicon chip(s) as the processor(s) and/or constructed with faster SRAM cells whilst system memory 303 might be constructed with slower DRAM cells. By tending to store more frequently used instructions and data in the cache 304 as opposed to the system memory 303, the overall performance efficiency of the computing system improves.

System memory 303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 303 prior to their being operated upon by the one or more processor(s) 301 in the implementation of a software program. Similarly, data that a software program determines should be sent from the computing system to an outside entity through one of the computing system interfaces, or stored into an internal storage element, is often temporarily queued in system memory 303 prior to its being transmitted or stored.

The ICH 305 is responsible for ensuring that such data is properly passed between the system memory 303 and its appropriate corresponding computing system interface (and internal storage device if the computing system is so designed). The MCH 302 is responsible for managing the various contending requests for system memory 303 access amongst the processor(s) 301, interfaces and internal storage elements that may proximately arise in time with respect to one another.

One or more I/O devices 308 are also implemented in a typical computing system. I/O devices generally are responsible for transferring data to and/or from the computing system (e.g., a networking adapter); or, for large scale non-volatile storage within the computing system (e.g., hard disk drive). ICH 305 has bi-directional point-to-point links between itself and the observed I/O devices 308.

Some portions of the detailed description are presented in terms of algorithms, discussions, or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method comprising:

identifying, by a processing device, a plurality of classes having respective instances included in source code, wherein each class corresponds to a subset of the source code;

determining, by the processing device, a first relationship between a first event-generating object instantiated from an event-generating class of the plurality of classes and a first event-receiving object instantiated from an event-receiving class of the plurality of classes, the first relationship identifying that the first event-generating object comprises source code for generating a first event and the first event-receiving object comprises source code for performing a first action in response to the first event;

determining, by the processing device, a second relationship between a second event-generating object instantiated from the event-generating class and a second event-receiving object instantiated from the event-receiving class, the second relationship identifying that the second event-generating object comprises source code for generating a second event and that the second event-receiving object comprises source code for performing a second action in response to the second event;

executing, by the processing device, the source code until the first event is reached, wherein execution of the source code is paused in response to the first event being reached;

providing, by the processing device, a graphical interface based on the first event being reached, the graphical interface comprising visual representations of the plurality of classes, the first event, and the first relationship, wherein the visual representation of the first relationship comprises a first link between the first event-generating object and the first event-receiving object;

executing, by the processing device, the source code until the second event is reached, wherein execution of the source code is paused in response to the second event being reached; and updating, by the processing device, the graphical interface based on the second event being reached, wherein the graphical interface as updated comprises visual representations of the second event and the second relationship, wherein the visual representation of the second relationship comprises a second link between the second event-generating object and the second event-receiving object.

2. The computer-implemented method set forth in claim 1, further comprising:

receiving input on the graphical interface defining at least one additional relationship between respective instances of at least two classes of the plurality of classes; and updating the source code to reflect the at least one additional relationship.

3. The computer-implemented method set forth in claim 2, wherein the input received via the graphical interface comprises a command identifying a connection between respective visual representations of the respective instances of the at least two classes in the graphical interface.

4. The method of claim 1,
wherein the source code includes repeated instances at least one class of the plurality of classes;
wherein a respective visual representation of the at least one class having the repeated instances comprises a single respective visual representation corresponding to the repeated instances.

5. The method of claim 1, wherein at least one of the first relationship and the second relationship comprises a data binding describing generating data by a respective instance of the event-generating class and consuming the generated data by a respective instance of the event-receiving class.

6. The method of claim 1, wherein the first event is identified by a first breakpoint for causing the source code to pause execution and the second event is identified by a second breakpoint for causing the source code to pause execution.

7. The method of claim 1, wherein the source code is executed after the first event is reached in response to receiving an input for resuming execution of the source code.

8. The method of claim 1, wherein the graphical interface includes the visual representations of the first relationship and the second relationship prior to the second event being reached, further comprising:

providing, by the processing device, a first visual indicator identifying the visual representation of the first relationship as associated with the first event based on the execution of the source code being paused in response to the first event being reached;

removing, by the processing device, the first visual indicator based on resuming the execution of the source code;

providing, by the processing device, a second visual indicator identifying the visual representation of the second relationship as associated with the second event based on the execution of the source code being paused in response to the second event being reached.

9. The method of claim 1, wherein the graphical interface is provided in response to receiving an input requesting a preview of the source code being executed.

10. The method of claim 1, further comprising providing, by the processing device, an additional graphical interface identifying at least one line of the source code being executed during the execution of the source code.

11. The method of claim 1, further comprising:

providing a first visual indicator identifying the first event-generating object and the first event-receiving object based on the execution of the source code being paused in response to the first event;

removing the first visual indicator based on resuming the execution of the source code; and providing a second visual indicator identifying the second event-generating object and the second event-receiving object based on the execution of the source code being paused in response to the second event.

12. The method of claim 1, further comprising providing, by the processing device, an additional graphical interface comprising visual representation of instances of the plurality of classes and of a plurality of relationships between instances of the plurality of classes, wherein the plurality of relationships includes the first and second relationships.

13. The method of claim 1, further comprising setting a first breakpoint for the first event and a second breakpoint for the first event, wherein execution of the source code is paused in response to the first breakpoint and the second breakpoint.

14. A computer system comprising:
a processor; and
a non-transitory computer-readable medium in communication with the processor;
wherein the processor is configured to execute program components tangibly embodied in the non-transitory computer-readable medium to perform operations comprising:

identifying a plurality of classes having respective instances included in source code by, wherein each class corresponds to a subset of the source code, determining a first relationship between a first event-generating object instantiated from an event-generating class of the plurality of classes and a first event-receiving object instantiated from an event-receiving class of the plurality of classes, the first relationship identifying that the first event-generating object comprises source code for generating a first event and the first event-receiving object comprises source code for performing a first action in response to the first event, determining a second relationship between a second event-generating object instantiated from the event-generating class and a second event-receiving object instantiated from the event-receiving class, the second relationship identifying that the second event-generating object comprises source code for generating a second event and that the second event-receiving object comprises source code for performing a second action in response to the second event, providing a graphical interface based on the first event being reached, the graphical interface comprising visual representations of the plurality of classes, the first event, and the first relationship, wherein the visual representation of the first relationship comprises a first link between the first event-generating object and the first event-receiving object, executing the source code until the second event is reached, wherein execution of the source code is paused in response to the second event being reached; and updating the graphical interface based on the second event being reached, wherein the graphical interface as updated comprises visual representations of the second event and the second relationship, wherein the visual representation of the second relationship comprises a second link between the second event-generating object and the second event-receiving object.

15. The system set forth in claim 14, wherein the operations further comprise:

receiving input on the graphical interface defining at least one additional relationship between respective instances of at least two classes of the plurality of classes; and updating the source code to reflect the at least one additional relationship.

16. The system set forth in claim 15, wherein the input received via the graphical interface comprises a command identifying a connection between respective visual representations of the respective instances of the at least two classes in the graphical interface.

17. The system set forth in claim 14, wherein the operations further comprise receiving data identifying a breakpoint in the graphical interface, the breakpoint identified by reference to a particular event illustrated in the graphical interface.

18. A method comprising identifying, by a processing device, a plurality of classes having respective instances included in source code, wherein each class corresponds to a subset of the source code;

determining, by the processing device, a first relationship between a first event-generating object instantiated from an event-generating class of the plurality of classes and a first event-receiving object instantiated from an event-receiving class of the plurality of classes, the first relationship identifying that the first event-generating object comprises source code for generating a first event and that that the first event-receiving object comprises source code for performing a first action in response to the first event;

determining, by the processing device, a second relationship between a second event-generating object instantiated from the event-generating class and a second event-receiving object instantiated from the event-receiving class of the plurality of classes, the second relationship identifying that the second event-generating object comprises source code for generating a second event and that the second event-receiving object comprises source code for performing a second action in response to the second event;

generating, by the processing device, a dynamic graphic interface having a first state and a second state, wherein the first state comprises first visual representations of the plurality of classes, the first event, and the first relationship, wherein the second state comprises second visual representations of the plurality of classes, the second event, and the second relationship, wherein the visual representation of the first relationship comprises a first link between the first event-generating object and the first event-receiving object and the visual representation of the second relationship comprises a second link between the second event-generating object and the second event-receiving object;

rendering, by the processing device, the graphical interface in the first state based on pausing execution of the source code in response to the first event being reached during the execution; and rendering, by the processing device, the graphical interface in the second state responsive to receiving input for stepping through states of the source code, wherein the input causes execution of the source code until the second event is reached, wherein the execution of the source code is paused in response to the second event being reached.

19. A non-transitory computer-readable medium embodying program code, the program code comprising:

program code for identifying a plurality of classes having respective instances included in source code, wherein each class corresponds to a subset of the source code;

program code for determining a first relationship between a first event-generating object instantiated from an event-generating class of the plurality of classes and a first event-receiving object instantiated from an event-receiving class of the plurality of classes, the first relationship identifying that the first event-generating object comprises source code for generating a first event and the first event-receiving object comprises source code for performing a first action in response to the first event;

program code for determining a second relationship between a second event-generating object instantiated from the event-generating class and a second event-receiving object instantiated from the event-receiving class, the second relationship identifying that the second event-generating object comprises source code for generating a second event and that the second event-receiving object comprises source code for performing a second action in response to the second event;

program code for executing the source code until the first event is reached, wherein execution of the source code is paused in response to the first event being reached;

program code for providing a graphical interface based on the first event being reached, the graphical interface comprising visual representations of the plurality of classes, the first event, and the first relationship, wherein the visual representation of the first relationship comprises a first link between the first event-generating object and the first event-receiving object;

program code for executing the source code until the second event is reached, wherein execution of the source code is paused in response to the second event being reached; and program code for updating the graphical interface based on the second event being reached, wherein the graphical interface as updated comprises visual representations of the second event and the second relationship, wherein the visual representation of the second relationship comprises a second link between the second event-generating object and the second event-receiving object.

* * * * *